(12) United States Patent
Watanabe

(10) Patent No.: US 8,882,423 B2
(45) Date of Patent: Nov. 11, 2014

(54) LIGHTNING-RESISTANT FASTENER AND MOUNTING STRUCTURE OF LIGHTNING-RESISTANT FASTENER

(75) Inventor: Yasunori Watanabe, Tokyo (JP)

(73) Assignee: Mitsubishi Aircraft Corporation, Aichi (JP)

( * ) Notice: Subject to any disclaimer, the term of this patent is extended or adjusted under 35 U.S.C. 154(b) by 271 days.

(21) Appl. No.: 13/313,582

(22) Filed: Dec. 7, 2011

(65) Prior Publication Data
US 2012/0155987 A1    Jun. 21, 2012

(30) Foreign Application Priority Data

Dec. 17, 2010 (JP) .................................. 2010-281890

(51) Int. Cl.
*F16B 21/00* (2006.01)

(52) U.S. Cl.
USPC .......................................... 411/337; 411/373

(58) Field of Classification Search
USPC .................. 411/337, 372.5, 372.6, 373–375; 244/1 A; 361/117, 218
See application file for complete search history.

(56) References Cited

U.S. PATENT DOCUMENTS

| | | | | |
|---|---|---|---|---|
| 972,140 | A | * | 10/1910 | Adam ............................ 411/429 |
| 1,472,389 | A | * | 10/1923 | Flannery et al. ............... 411/374 |
| 4,557,654 | A | * | 12/1985 | Masuda et al. ................. 411/431 |
| 4,711,760 | A | * | 12/1987 | Blaushild ....................... 376/399 |
| 4,905,931 | A | | 3/1990 | Covey |
| 4,944,644 | A | * | 7/1990 | Bell ............................... 411/375 |
| 6,053,683 | A | * | 4/2000 | Cabiran ....................... 411/372.6 |
| 6,135,691 | A | * | 10/2000 | Nadarajah et al. ............. 411/431 |
| 6,273,658 | B1 | * | 8/2001 | Patterson et al. .............. 411/431 |
| 6,286,774 | B1 | * | 9/2001 | Oh .................................. 242/283 |
| 7,658,580 | B1 | * | 2/2010 | Conway et al. ................ 411/374 |
| 8,451,577 | B2 | * | 5/2013 | Bessho et al. .................. 361/218 |
| 8,520,358 | B2 | * | 8/2013 | Bessho et al. .................. 361/218 |

FOREIGN PATENT DOCUMENTS

| | | |
|---|---|---|
| JP | 2-7398 A | 1/1990 |
| JP | 09-14240 A | 1/1997 |
| JP | 2004-169853 A | 6/2004 |
| JP | 2010-254287 A | 11/2010 |

OTHER PUBLICATIONS

Canadian Examiner's Report for application No. 2,759,318 dated Mar. 28, 2013.
Japanese Office action for Application No. 2010-281890 dated Oct. 25, 2013.

* cited by examiner

*Primary Examiner* — Gary Estremsky
(74) *Attorney, Agent, or Firm* — Pearne & Gordon LLP

(57) ABSTRACT

To provide a lightning-resistant fastener capable of assuring a sufficient lightning-resistant performance. A cap 30A has an elastically deformable part 50 continuous in the circumferential direction thereof. The elastically deformable part 50 has a smaller thickness than the other parts of the cap 30A in a circumferentially continuous area thereof. Since the cap 30A has the elastically deformable part 50, even if a surface 22b of a member 22 is inclined with respect to a plane perpendicular to the axis of a fastener main body 25, the cap 30A can be installed without forming a gap.

18 Claims, 9 Drawing Sheets

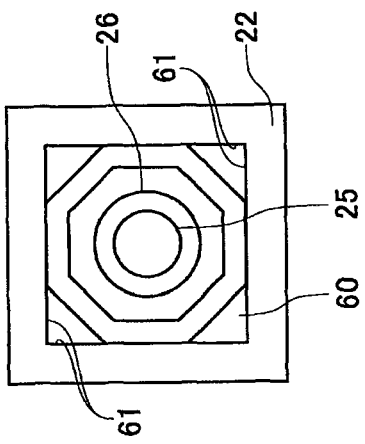
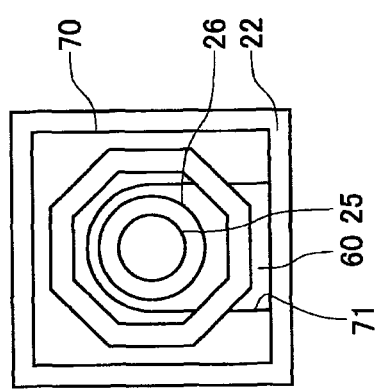
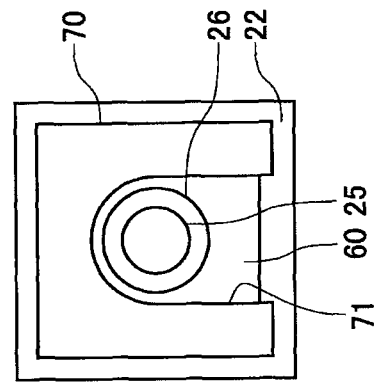

LIGHTNING-RESISTANT FASTENER AND MOUNTING STRUCTURE OF LIGHTNING-RESISTANT FASTENER

BACKGROUND OF THE INVENTION

1. Field of the Invention

The present invention relates to a lightning-resistant fastener, which is used for an airframe of an aircraft, especially for a wing thereof, and a method of mounting a lightning-resistant fastener.

2. Description of the Related Art

A wing constituting an airframe of an aircraft is of a hollow construction, and a wing surface panel forming a wing surface is fixed to a structural member existing in the wing by a fastener member (fastener).

The fastener member fastens the wing to the structural member by inserting a pin-shaped fastener main body into through holes, which have been formed in both the wing and the member attached to the wing, from the outside of wing, and by fixing the front end portion of the fastener main body by using a fixture from the interior side of the wing.

The aircraft must make thoroughgoing provisions against lightning strikes. In the case where the wing surface panel and the fastener member are made of different materials, at the time of lightning strikes, an arc discharge (spark) is produced in the direction extending along the interface between the wing surface panel and the fastener member by an electric potential difference between the wing surface panel and the fastener member. Since a fuel tank is housed in the internal space of the wing, it is necessary to reliably suppress the production of arc discharge at the time of lightning strikes.

To meet such necessity, a structure has conventionally been proposed in which, as shown in FIG. 9, on the inside of a wing 1, a cap 6 is installed in a state of being separate from a fastener main body 4a of a fastener member 4, which penetrates a first member 2 corresponding to the wing surface panel and a second member 3 installed within the wing, and a fixture 4b, and an air-gap 7 filled with air is formed between the cap 6 and the fastener main body 4a, the fixture 4b (for example, refer to Japanese Patent Laid-Open No. 2-7398).

However, the technique descried in Japanese Patent Laid-Open No. 2-7398 does not provide a structure in which the cap 6 can be positioned with respect to the fastener member 4, and the installation position of the cap 6 depends on the worker. Therefore, the center of the cap 6 and the center of the fastener member 4 may shift greatly. If in the air-gap 7, a place where a gap between the fastener member 4 and the cap 6 is narrow is produced, the function (insulation properties) of the cap 6 decreases. In the worst case, if the cap 6 is installed in a state of being in contact with the fastener member 4, the function itself of the cap 6 may be impaired greatly.

The cap 6 is installed on the second member 3 with an adhesive 9 as shown in FIG. 9A, or is outer-peripherally covered with a rubber (insulating material) 10 as shown in FIG. 9B. Therefore, in the installation site, the bonding work or the coating work of the rubber 10 is required, so that the work takes much time and labor. Needless to say, the interior of the wing 1 of aircraft has a narrow space, and the above-described work performed at a secluded position provides very poor workability. Moreover, since the fastener member 4 is provided at several thousands to several ten thousands places throughout the wing 1, the deterioration in workability leads directly to the rise in cost.

Furthermore, the above-described work is what is called manual work, so that the work quality is easily varied depending on the worker, which also exerts an influence on the reliability.

To solve the problems, the inventors have already proposed a technique in which a fastener member has an engaging part formed in a portion projecting to the interior side of an airframe, a cap has an engaged part to be engaged with the engaging part of the fastener member in a central portion of the inner peripheral surface thereof, and the engaging part of the fastener member is engaged with the engaged part (see Japanese Patent Laid-Open No. 2010-254287).

However, according to the techniques described above, the axis of the fastener member is not always perpendicular to the inner peripheral surface of the wing 1. For example, the second member 3 mounted on the inner peripheral surface of the wing 1 may be inclined with respect to the axis of the fastener member 4 as shown in FIG. 9. In such a case, when the cap 6 is engaged with the fastener member 4, a gap occurs between an outer circumferential edge 6a of the cap 6 and the second member 3, and therefore, a sufficient lightning-resistant performance cannot be assured.

In addition, if the ambient temperature repeatedly varies significantly, the cap 6 may be loosened, and a gap may occur between the outer circumferential edge 6a of the cap 6 and the second member 3.

The present invention has been accomplished in view of the technical problems described above, and an object of the present invention is to provide a lightning-resistant fastener capable of assuring a sufficient lightning-resistant performance.

SUMMARY OF THE INVENTION

To attain the object, the present invention provides a lightning-resistant fastener comprising: a fastener member used for fastening a second member to a first member constituting an airframe of an aircraft, the fastener member being made of a conductive material; and a cap installed so as to cover the fastener member projecting to the interior side of the airframe, the cap being made of an insulating material, wherein the fastener member has an engaging part in a portion projecting to the interior side of the airframe, the cap has an engaged part to be engaged with the engaging part of the fastener member in a central portion of the inner peripheral surface thereof, the cap being installed to the fastener member with the engaged part being engaged with the engaging part of the fastener member, a tip end part of the cap opposite to the engaged part abutting against the second member, and a gap being provided between the fastener member and a portion of the cap other than the engaged part, and an elastically deformable part is provided to allow the cap to be elastically deformed in the direction to compress the cap between the engaged part and the tip end part abutting against the second member while the engaged part is engaged with the engaging part.

As the elastically deformable part, the cap may have a part continuous in the circumferential direction of the cap having a smaller thickness than another part formed between the engaged part and the tip end part or at the tip end part.

When the engaged part of the cap is engaged with the engaging part, the fastening force acts in the direction to compress the cap between the engaged part and the tip end part abutting against the second member. At this point, the elastically deformable part is elastically deformed. As a result, for example, even if the second member is inclined with respect to the axis of the fastener member, the cap can be deformed to conform to the inclination to come into intimate contact with the second member.

An annular seal member continuous in the circumferential direction of the cap may be provided on the abutment surface between the tip end part of the cap and the second member. In this case, the sealability at the abutment surface between the cap and the second member can be improved.

The present invention also provides a structure for mounting a lightning-resistant fastener comprising: a fastener member used for fastening a second member to a first member constituting an airframe of an aircraft, the fastener member being made of a conductive material; and a cap comprising an open end opening at one end and installed so as to cover the fastener member projecting to the interior side of the airframe, the cap being made of an insulating material, wherein a recess is formed in a surface of the second member, and the cap is installed with the open end being housed in the recess formed in the second member.

If the open end of the cap is housed in the recess of the second member in this way, even if an arc discharge occurs between the cap and the second member, the spark can be prevented from leaking to the outside from the recess.

The outer peripheral surface of the open end of the cap can have any shape. For example, the outer peripheral surface of the open end of the cap may have a polygonal cross section in the direction perpendicular to the axis of the fastener member, and the inner peripheral surface of the recess may include an opposing surface that is opposite to the outer peripheral surface of the open end having the polygonal cross section. In this case, the outer peripheral surface of the cap abuts against the opposing surface of the recess, so that rotation and loosening of the cap can be prevented.

Alternatively, the outer peripheral surface of the open end of the cap may have a circular cross section in the direction perpendicular to the axis of the fastener member, and the recess may have a circular shape, and the inner peripheral surface of the recess may include an opposing surface that is opposite to the outer peripheral surface of the open end.

Furthermore, an annular seal member continuous in the circumferential direction of the cap may be provided on the abutment surface between the tip end part of the cap and the second member.

A screw groove may be formed in the outer peripheral surface of the open end of the cap, a screw groove to be engaged with the screw groove of the open end may be formed in the inner peripheral surface of the recess, and the cap may be installed by screwing the open end of the cap into the recess.

Furthermore, a mark that indicates the amount of a sealant charged into the cap may be formed on the inner peripheral surface of the cap.

According to the present invention, a gap can be prevented from occurring between the cap and the second member to assure a sufficient lightning-resistant performance.

BRIEF DESCRIPTION OF THE DRAWINGS

FIG. 1 are diagrams showing a construction of a fastener member according to a first embodiment, in which

FIG. 2 are diagrams showing a construction of a fastener member according to a modification of the first embodiment, in which

DETAILED DESCRIPTION OF THE PREFERRED EMBODIMENTS

Figure 1A:
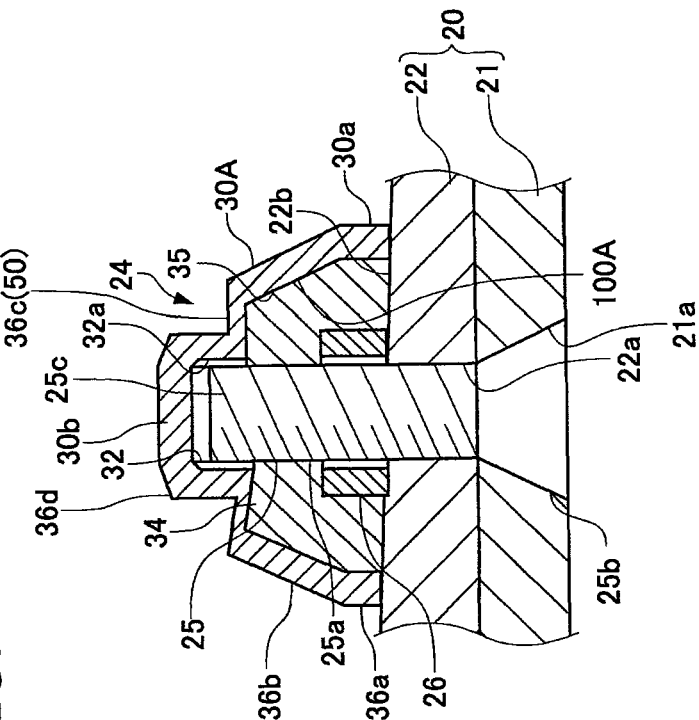
FIG. 1A is a sectional view showing the fastener member yet to be fastened.

The present invention will now be described in detail based on an embodiment shown in the accompanying drawings.
[First Embodiment]
FIG. 1 is a sectional view of a part of a wing constituting an airframe of an aircraft, to which a lightning-resistant fastener, a cap and a method of mounting the lightning-resistant fastener in accordance with the embodiment shown below are applied.

As shown in FIG. 1, a wing 20 comprises a wing panel (first member) 21 as the outer shell thereof. The wing panel 21 is, for example, made of CFRP (Carbon Fiber Reinforced Plastics), which is a composite material of a carbon fiber and a resin, or a metallic material such as an aluminum alloy. A structural member for reinforcement, a fuel tank, and various types of equipment, which are provided within the wing 20, are fixed to the wing panel 21 via a member (second member) 22 such as a stay. The stay is made of a metallic material such as an aluminum alloy. The member 22 such as the stay is installed on the wing panel 21 by using a fastener member 24.

The fastener member 24 comprises a pin-shaped fastener main body 25, and a collar 26 mounted on the fastener main body 25 on the interior side of the wing 20.

The fastener main body 25 and the collar 26 are generally made of a metallic material from the viewpoint of strength. The pin-shaped fastener main body 25 comprises a screw groove (engaging part) 25a on the front end portion thereof. The rear end portion of the pin-shaped fastener main body 25 is formed into a head part 25b in which the diameter increases from the front end portion side. This fastener main body 25 is inserted into holes 21a and 22a, which are formed penetratingly in the wing panel 21 and the member 22, from the outside of the wing 20. The front end portion of the pin-shaped fastener main body 25 is projected to the inside of the wing 20 in a state in which the head part 25b in the rear end portion is abutted against the peripheral surface of the hole 21a.

The collar 26 has a tubular shape, and the inner peripheral surface thereof comprises a screw groove engaging with the screw groove 25a of the fastener main body 25. This collar 26 is screwed onto the screw groove 25a of the fastener main body 25 projecting to the inside of the wing 20. Thereby, the wing panel 21 and the member 22 are held between the head part 25b of the fastener main body 25 and the collar 26, and thereby the member 22 is fixed to the wing panel 21. Note that a washer (not shown) made of an insulating material such as polyimide is disposed between the collar 26 and the member 22.

In this state, a front end part 25c of the fastener main body 25 projects to the inner periphery side of the wing 20 from the collar 26, and further a certain length of the screw groove 25a is exposed to the inner periphery side of the wing 20 from the collar 26.

In the internal space of the wing 20, a cap 30A is mounted on the fastener main body 25, and the interior of the cap 30A is filled with an insulating sealant 34. The sealant 34 interposed between the inner peripheral surface of the cap 30A and the fastener main body 25 and collar 26 further enhances the insulation properties between the cap 30A and the fastener main body 25.

The cap 30A has a shape such that only the one end part (front end portion, opening end) 30a side is open, and the inside diameter and the outside diameter thereof decrease gradually toward the other end part 30b side. This cap is preferably made of an insulating resin such as PPS (polyphenylene sulfide resin), polyimide, PEEK (polyether ether ketone resin), and nylon resin.

On the inner peripheral surface on the other end part 30b side (hereinafter, the inner peripheral surface is referred to as a bottom surface) of the cap 30A, a bottomed hole (engaged part) 32 having a circular cross section is formed. The inner peripheral surface of the hole 32 comprises a screw groove (engaged part) 32a engaged with the screw groove 25a of the fastener main body 25. This cap 30A is configured so that the front end part 25c of the fastener main body 25 is inserted into the hole 32. At this time, the screw groove 32a of the cap 30A engages with the screw groove 25a of the fastener main body 25, whereby the cap 30A can be positioned and fixed to the fastener main body 25 easily and reliably.

For this cap 30A, the inside diameter of an inner peripheral surface 35 is set so that when the cap 30A is installed on the fastener main body 25, a predetermined gap is formed with respect to the fastener main body 25, and the collar 26.

The cap 30A comprises a straight part 36a having a fixed diameter formed on the one end part 30a side thereof, a tapered part 36b extending from the straight part 36a toward the hole 32 by gradually decreasing the inside diameter thereof, a disk-shaped part 36c having a circular plate shape, and a top part 36d in which the hole 32 is formed.

Figure 1B:
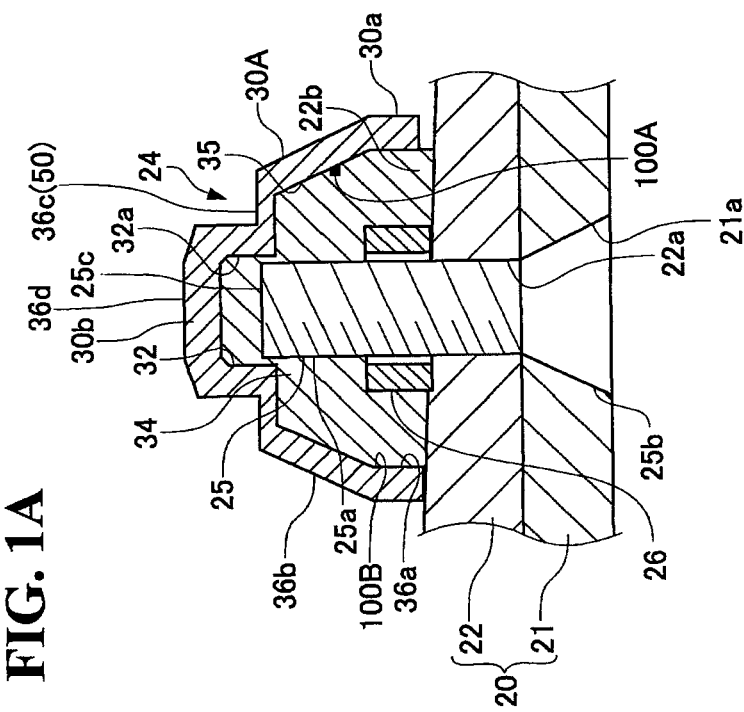
FIG. 1B is a sectional view showing the fastener member fastened.
Figure 2A:
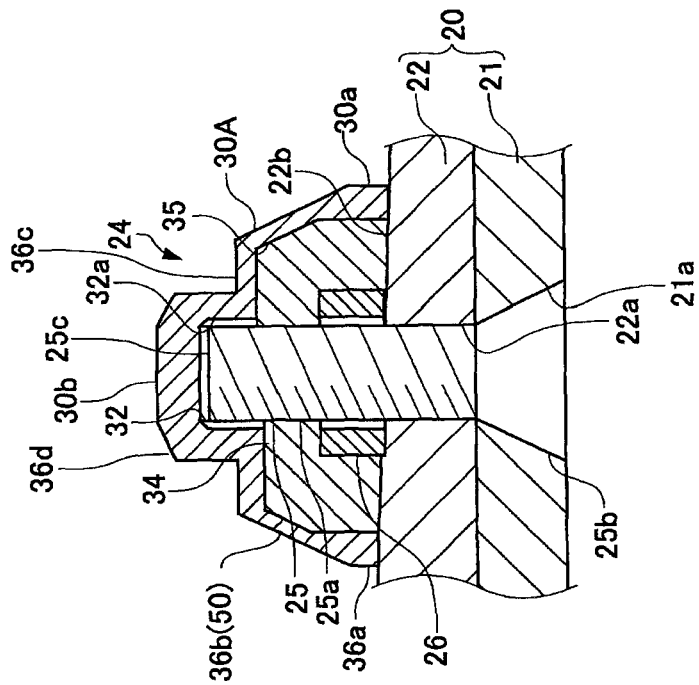
FIG. 2A is a sectional view showing the fastener member yet to be fastened.

The cap 30A has an elastically deformable part 50 continuous in the circumferential direction thereof. The elastically deformable part 50 has a smaller thickness than the other parts of the cap 30A in a circumferentially continuous area thereof. The elastically deformable part 50 may be formed in the disk-shaped part 36c as shown in FIG. 1 or in the tapered part 36b as shown in FIG. 2, for example.

When the cap 30A is installed on the fastener main body 25 for fastening the wing panel 21 and the member 22 together, the interior of the cap 30A is beforehand filled with the uncured sealant 34. To prevent the amount of the sealant 34 from being insufficient or excessive, a mark indicating the charge level of the sealant 34 is formed on the inner peripheral surface of the cap 30A, for example.

For example, the mark may be an indicator line 100A that indicates the charge level of the sealant 34 formed on the inner peripheral surface of the cap 30A. Alternatively, the mark indicating the charge level of the sealant 34 may be an inflexion point 100B of the cap 30A, which is the boundary between the straight part 36a and the tapered part 36b.

In the internal space of the wing 20, the cap 30A is pushed against the fastener main body 25 projecting to the inside.

At this time, the sealant 34 filled in the cap 30A overflows through the opening portion of the one end part 30a of the cap 30A. It is preferable that the sealant 34 overflow from the entire periphery of the cap 30A so that the sealant 34 spreads uniformly to the entire zone in the cap 30A.

When the cap 30A is pushed against the fastener main body 25 increasingly, since the hole 32 is formed in the cap 30A, the fastener main body 25 can be positioned reliably and easily at the center of the cap 30A. Thereby, a phenomenon can be prevented that the cap 30A and the fastener main body 25 shift from each other and the gap between the cap 30A and the fastener main body 25 becomes narrow depending on the place, and also a phenomenon can be prevented that the fastener main body 25 comes into direct contact with the cap 30A.

After the hole 32 of the cap 30A has been pushed against the fastener main body 25, the cap 30A is turned to be screwed on the fastener main body 25.

Figure 2B:
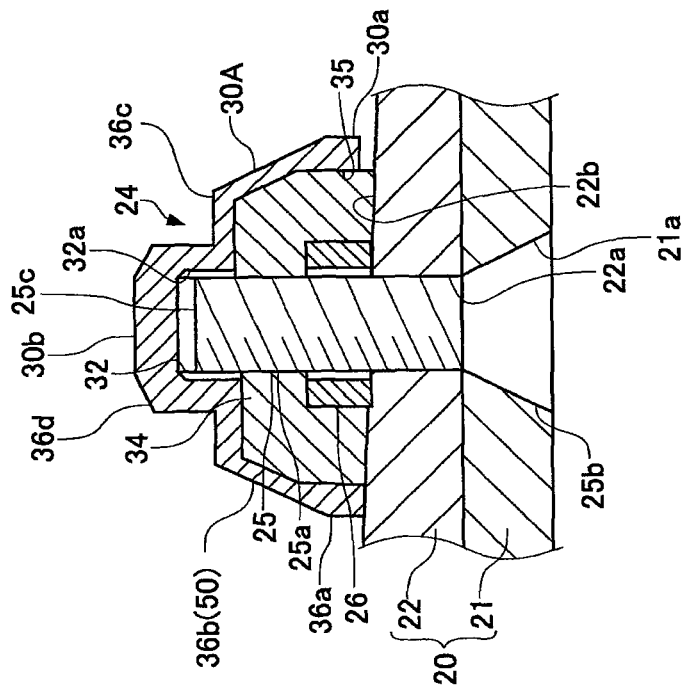
FIG. 2B is a sectional view showing the fastener member fastened.

When the cap 30A is screwed until the one end part 30a of the cap 30A is pushed against the member 22, the screwing of the cap 30A is finished. At this time, if the surface 22b of the member 22 is inclined with respect to a plane perpendicular to the axis of the fastener main body 25 as shown in FIGS. 1B and 2B, the elastically deformable part 50 warps, so that the one end part 30a of the cap 30A abuts against the surface 22b of the member 22 along the entire circumference thereof. In this way, a gap is prevented from being formed between the surface 22b of the member 22 and the one end part 30a of the cap 30A.

In this state, the screw groove 25a formed on the fastener main body 25 engages with the screw groove 32a formed in the hole 32 of the cap 30A, so that the cap 30A is reliably and fixedly held to the fastener main body 25. Also, if the filling sealant 34 is cured, this sealant 34 also achieves an effect of fixing the cap 30A to the fastener main body 25.

Thus, the fastener member 24 on which the cap 30A is installed is a lightning-resistant fastener.

As described above, the cap 30A comprises the hole 32, and the screw groove 32a is formed in the hole 32, whereby the cap 30A can be positioned and installed reliably and easily on the fastener main body 25, and even after installation, the cap 30A can be reliably prevented from coming off.

Also, if the cap 30A has been screwed on the fastener main body 25, the cure of the sealant 34 need not be waited, and the installation work of the cap 30A can be performed rapidly.

Thereby, while the insulation properties are assured reliably, the workability is improved to reduce the manufacturing cost, and the cap 30A can be installed with stable quality irrespective of workers.

Since the cap 30A has the elastically deformable part 50, even if the surface 22b of the member 22 is inclined with respect to a plane perpendicular to the axis of the fastener main body 25, the cap 30A can be installed without forming a gap. In this way, a sufficient lightning-resistant performance is assured.

[Second Embodiment]

A second embodiment described below is basically the same as the first embodiment except for a cap 30B of a different construction than the cap 30A, and the other components are the same as those in the first embodiment. The following description will be primarily focused on the difference from the first embodiment described above, and descriptions of the common components will be omitted.

Figure 3A:
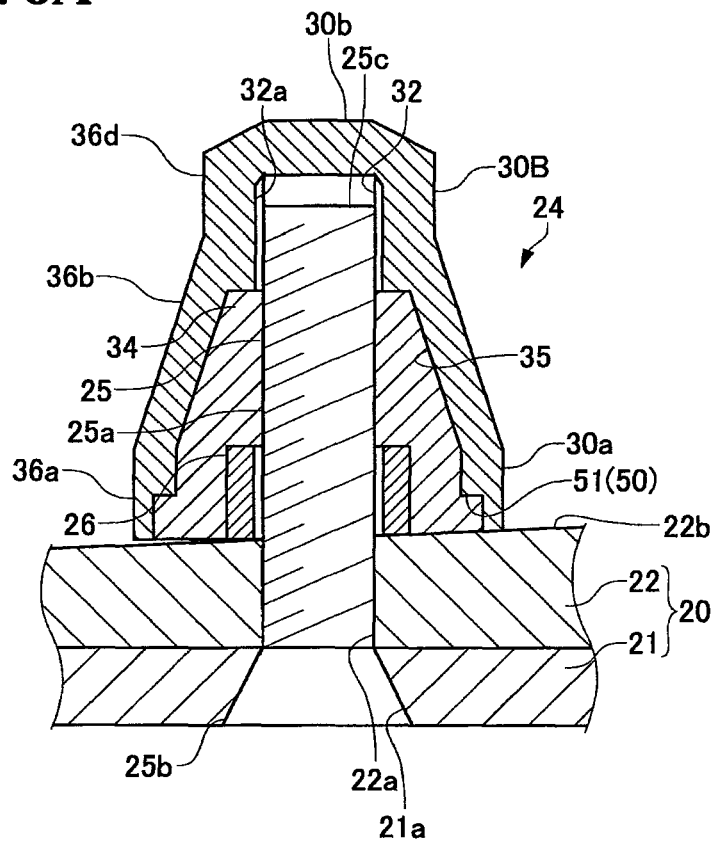
FIG. 3A is a sectional view showing a construction of a fastener member according to a second embodiment.
Figure 3B:
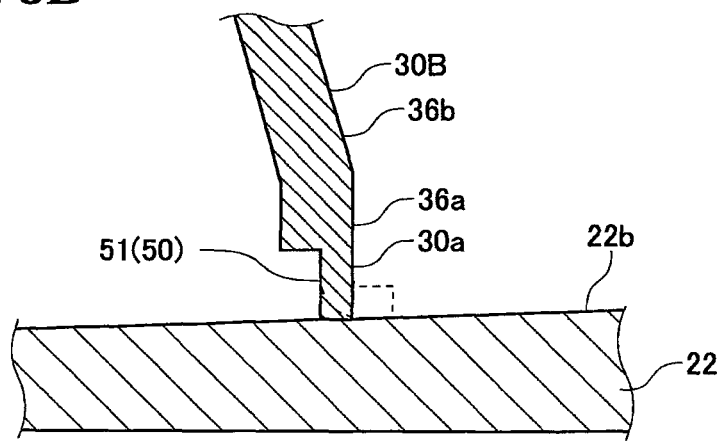
FIG. 3B is an enlarged view of essential parts thereof.

As shown in FIG. 3, the cap 30B according to this embodiment differs from the cap 30A according to the first embodiment in that the cap 30B does not have the disk-shaped part 36c and comprises the straight part 36a, the tapered part 36b, and the top part 36d.

Such a cap 30B has a stepped part 51 formed in the one end part 30a thereof on the inner periphery side, and the stepped part 51 has a smaller thickness t than the other parts of the cap 30B and serves as the elastically deformable part 50.

With such a construction, when the surface 22b of the member 22 is inclined with respect to a plane perpendicular to the axis of the fastener main body 25, the one end part 30a of the cap 30B, which serves as the elastically deformable part 50, warps, so that the one end part 30a of the cap 30B abuts against the surface 22b of the member 22 along the entire circumference thereof. In this way, a gap is prevented from being formed between the surface 22b of the member 22 and the one end part 30a of the cap 30B. In this way, a sufficient lightning-resistant performance is assured.

[Third Embodiment]

A third embodiment described below is basically the same as the second embodiment except for the construction of the cap 30B, and the other components are the same as those in the second embodiment. The following description will be primarily focused on the difference from the second embodiment described above, and descriptions of the common components will be omitted.

Figure 4:
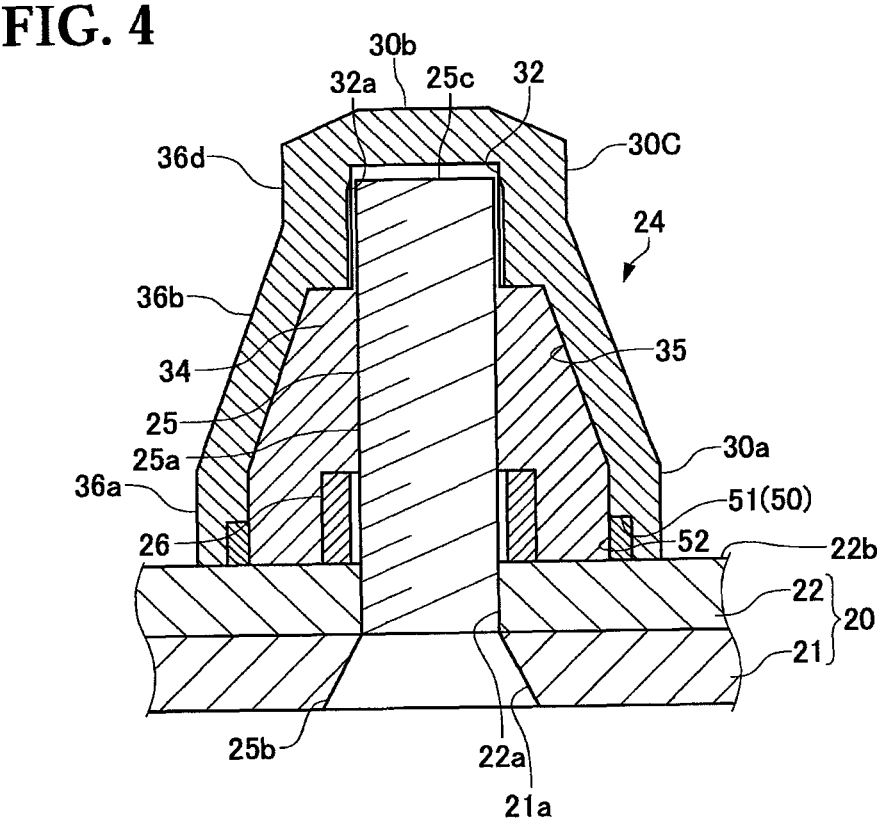
FIG. 4 is a sectional view showing a construction of a fastener member according to a third embodiment.

As shown in FIG. 4, as with the cap 30B according to the second embodiment, the cap 30C according to this embodiment comprises the straight part 36a, the tapered part 36b, and the top part 36d. The cap 30C further has the stepped part 51 formed in the one end part 30a thereof on the inner periphery side.

A ring-shaped seal member 52 made of a rubber-based material is provided in the stepped part 51.

With such a construction, when the surface 22b of the member 22 is inclined with respect to a plane perpendicular to the axis of the fastener main body 25, the seal member 52 provided at the one end part 30a of the cap 30C, which serves as the elastically deformable part 50, prevents a gap from being formed between the surface 22b of the member 22 and the one end part 30a of the cap 30B.

Furthermore, the one end part 30a warps, so that the one end part 30a of the cap 30B abuts against the surface 22b of the member 22 along the entire circumference thereof. In this way, a gap is prevented from being formed between the surface 22b of the member 22 and the one end part 30a of the cap 30B.

In this way, a sufficient lightning-resistant performance is assured.

[Fourth Embodiment]

The following description of a fourth embodiment will be primarily focused on differences from the first embodiment described above, and descriptions of the common components will be omitted.

Figure 5A:
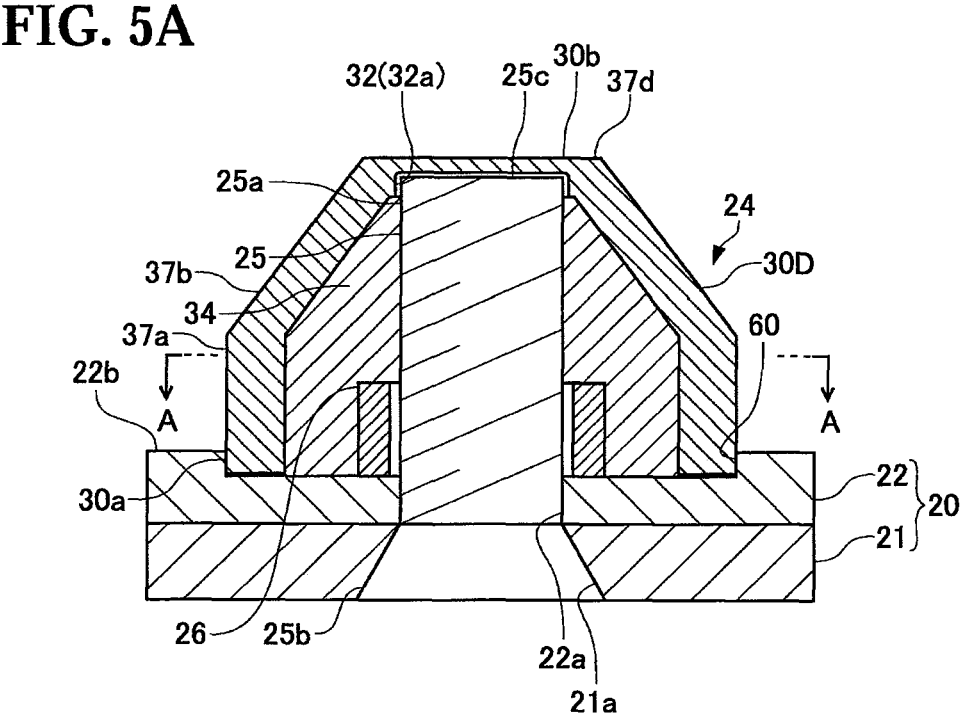
FIG. 5A is a sectional view showing a construction of a fastener member according to a fourth embodiment.
Figure 5B:
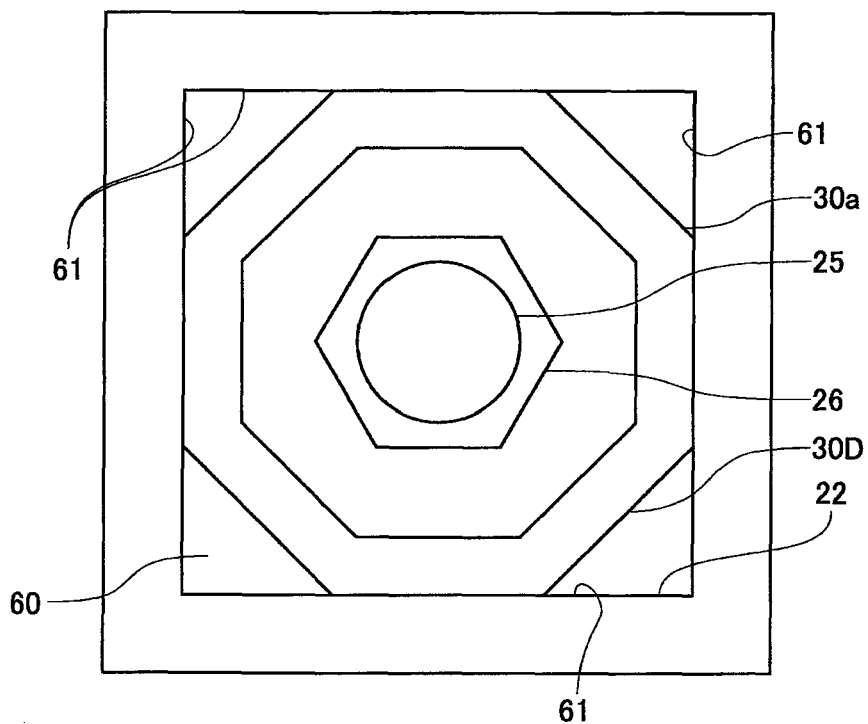
FIG. 5B is a sectional view taken along the line A-A in FIG. 5A.

As shown in FIGS. 5A and 5B, a cap 30D according to this embodiment has an octagonal or other polygonal cross section in a plane perpendicular to the axis of the fastener main body 25. The cap 30D is the same as the cap 30A according to the first embodiment described above in that the bottomed hole 32 having a circular cross section is formed in the bottom surface at the other end part 30b side thereof. In the inner peripheral surface of the hole 32, the screw groove 32a to be engaged with the screw groove 25a of the fastener main body 25 is formed. The engagement of the screw groove 32a of the cap 30D with the screw groove 25a of the fastener main body 25 allows the cap 30D to be positioned with respect to and fixed to the fastener main body 25 easily and with reliability.

The cap 30D comprises a straight part 37a having a fixed diameter dimension formed on the one end part 30a side thereof, a tapered part 37b extending from the straight part 37a toward the hole 32 by gradually decreasing the inside diameter, and a top part 37d in which the hole 32 is formed.

In the surface 22b of the member 22, a recess 60 is formed at a part on which the cap 30D is installed. The recess 60 has a fixing wall (an opposing surface) 61 that comes into contact with at least two of the sides of the straight part 37a having the polygonal shape of the cap 30D. According to this embodiment, the recess 60 has a rectangular shape, and the fixing wall 61 is in contact with four sides of the straight part 37a.

The straight part 37a of the cap 30D is fitted into the recess 60 with the four sides being opposite to the fixing wall 61 in the vicinity thereof.

The cap 30D is installed with the one end part 30a of the cap 30D fitted in the recess 60 as described below.

Figure 6A:
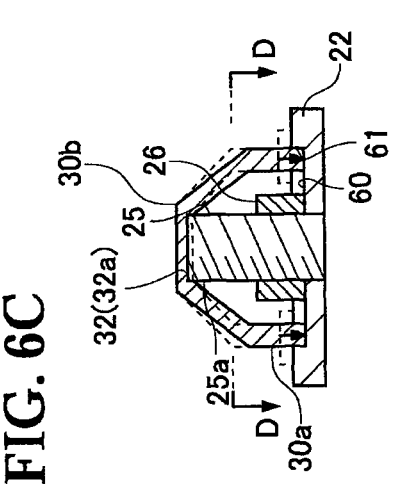
FIG. 6 are diagrams for illustrating a procedure of mounting the fastener member shown in FIGS. 5A and 5B.

First, as shown in FIG. 6A, the fastener main body 25 and the collar 26 are fastened, and then, a plate 70 is set to cover the recess 60. The plate 70 is sized to be larger than the area of the opening of the recess 60 and has a slit 71 opening in one side. The width of the opening of the slit 71 is larger than the diameter of the fastener main body 25.

Figure 6B:
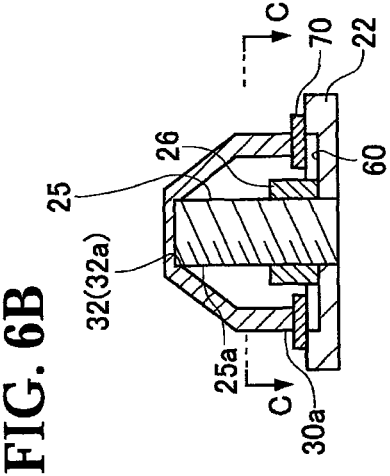

Then, as shown in FIG. 6B, the cap 30D is temporarily installed on the fastener main body 25. In this step, the screw groove 32a of the cap 30D is screwed onto the screw groove 25a of the fastener main body 25 until the one end part 30a abuts against the plate 70. Then, the screw groove 32a of the cap 30D is further screwed to firmly press the one end part 30a against the plate 70. Then, the one end part 30a of the cap 30D is elastically deformed toward the other end part 30b.

To increase the degree of the elastic deformation of the cap 30D, the elastically deformable part 50 shown in the second and third embodiments may be provided.

Figure 6C:
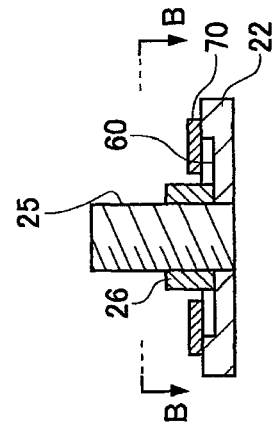

In this state, the plate 70 is pulled out along the slit 71. Then, as shown in FIG. 6C, the elastically deformed cap 30D is relieved, and the one end part 30a is restored to its original shape in the direction away from the other end part 30b. As a result, the one end part 30a of the cap 30D enters the recess 60 to come into contact with the fixing wall 61.

With such a construction, since the one end part 30a of the cap 30D is fitted in the recess 60, even if an arc discharge occurs between the one end part 30a of the cap 30D and the surface 22b of the member 22 (a bottom surface 60a of the recess 60), the fixing wall 61 of the recess 60 can prevent the arc from leaking to the outside.

In addition, the fixing wall 61 limits rotation of the cap 30D, thereby preventing loosening of the cap 30D.

In addition, in installation of the cap 30D, the cap 30D can be fastened with higher torque, since the cap 30D is elastically deformed by the plate 70.

In this way, a sufficient lightning-resistant performance is assured.

[Fifth Embodiment]

The following description of a fifth embodiment will be primarily focused on differences from the fourth embodiment described above, and descriptions of the common components will be omitted.

Figure 7:
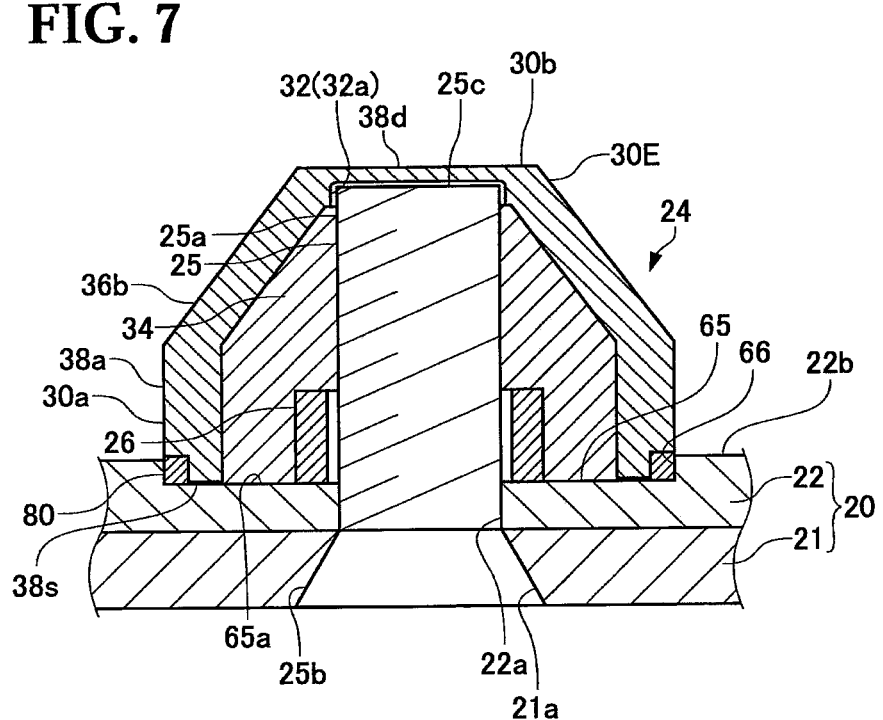
FIG. 7 is a sectional view showing a construction of a fastener member according to a fifth embodiment.

As shown in FIG. 7, a cap 30E has a circular cross section in a plane perpendicular to the axis of the fastener main body 25. The cap 30E is the same as the cap 30A according to the first embodiment described above in that the bottomed hole 32 having a circular cross section is formed in the bottom surface at the other end part 30b side thereof, and the screw groove 32a to be engaged with the screw groove 25a of the fastener main body 25 is formed in the inner peripheral surface of the hole 32. The engagement of the screw groove 32a of the cap 30D with the screw groove 25a of the fastener main body 25 allows the cap 30E to be positioned with respect to and fixed to the fastener main body 25 easily and with reliability.

The cap 30E comprises a straight part 38a having a fixed diameter dimension formed on the one end part 30a side thereof, a tapered part 38b extending from the straight part 38a toward the hole 32 by gradually decreasing the inside diameter, and a top part 38d in which the hole 32 is formed.

In addition, a ring-shaped seal member 80 made of a rubber-based material is provided on the outer peripheral surface of the straight part 38a of the cap 30E.

In the surface 22b of the member 22, a recess 65 having an inside diameter approximately equal to the outside diameter of the straight part 38a of the cap 30E is formed at a part on which the cap 30E is installed.

The straight part 38a of the cap 30E is fitted into the recess 65, and the seal member 80 provided on the outer peripheral surface comes into contact with an inner periphery surface (an opposing surface) 66 of the recess 65.

To install the cap 30E with the one end part 30a fitted in the recess 65, the fastener main body 25 and the collar 26 can be fastened, and then, the screw groove 32a of the cap 30E can be screwed onto the screw groove 25a of the fastener main body 25.

Then, when the one end part 30a abuts against the plate 70, the seal member 80 is in intimate contact with the inner peripheral surface 66 of the recess 65.

With such a construction, since the one end part 30a of the cap 30E is fitted in the recess 65, even if an arc discharge occurs between the one end part 30a of the cap 30E and the surface 22b of the member 22 (a bottom surface 65a of the recess 65), the inner peripheral surface 66 of the recess 65 can prevent the arc from leaking to the outside.

In addition, the seal member 80 limits rotation of the cap 30E, thereby preventing loosening of the cap 30E.

In this way, a sufficient lightning-resistant performance is assured.

Although the seal member 80 is provided on the outer peripheral surface of the straight part 38a in this embodiment, it is essential only that the seal member 80 is in intimate contact with the recess 65. For example, the seal member 80 may be provided on a tip end surface 38s of the straight part 38 so that the seal member 80 is in intimate contact with the bottom surface 65a of the recess 65 and provides sealability.

[Sixth Embodiment]

The following description of a sixth embodiment will be primarily focused on differences from the fifth embodiment described above, and descriptions of the common components will be omitted.

Figure 8:
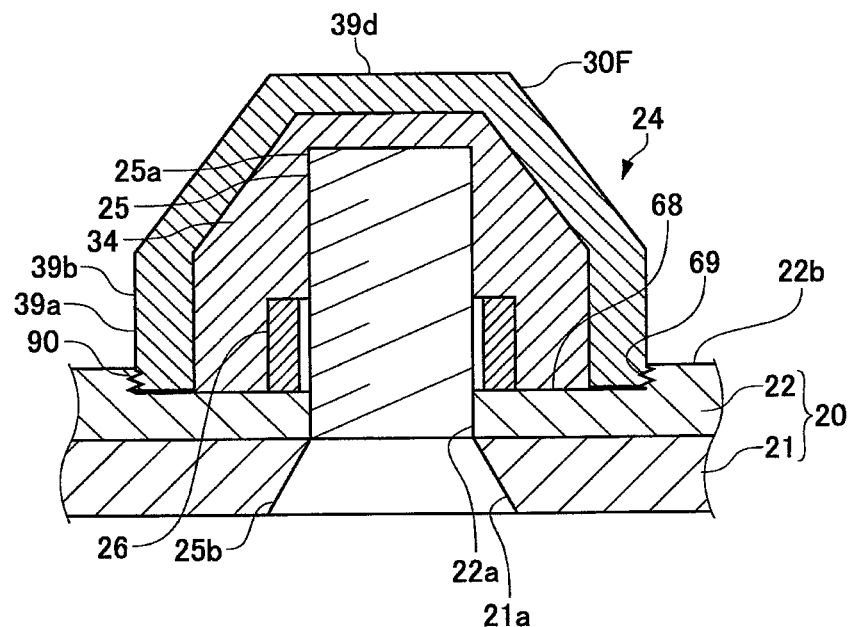
FIG. 8 is a sectional view showing a construction of a fastener member according to a sixth embodiment.
Figure 9A:
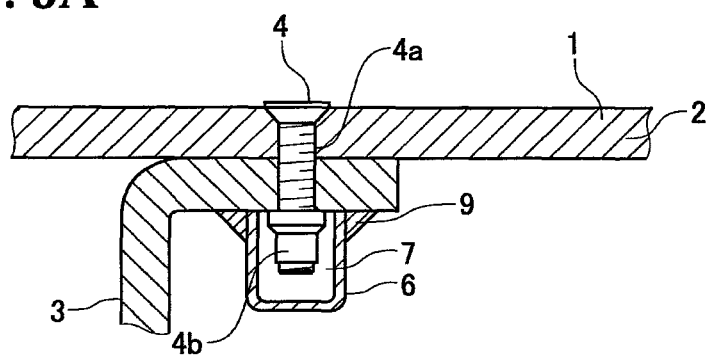
FIG. 9 are sectional views showing a construction of a conventional fastener member.
Figure 9B:
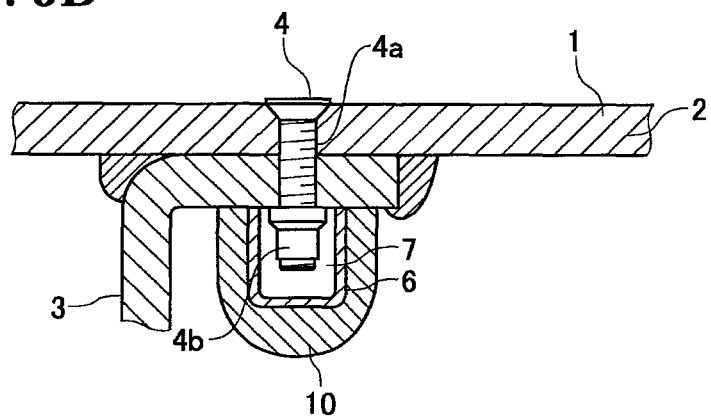

As shown in FIG. 8, a cap 30F has a circular cross section in a plane perpendicular to the axis of the fastener main body 25 and comprises a straight part 39a having a fixed diameter dimension formed on the one end part 30a side thereof, a tapered part 39b whose inside diameter gradually decreases toward the other end part 30b, and a top part 39d.

The cap 30F differs from the cap 30A according to the first embodiment described above in that the bottomed hole 32 having a circular cross section is not formed in the top part 39d on the other end part 30b side. A screw groove 90 is formed in the outer peripheral surface of the straight part 39a of the one end part 30a of the cap 30F according to this embodiment.

In the surface 22b of the member 22, a recess 68 having an inside diameter approximately equal to the outside diameter of the straight part 39a of the cap 30F is formed at a part on which the cap 30F is installed. A screw groove 69 is formed in the inner peripheral surface of the recess 68.

With such a construction, the cap 30F is installed by screwing the screw groove 90 into the screw groove 69 of the recess 68. Once the cap 30F is installed, the straight part 39a is fitted in the recess 68.

To install the cap 30F with the one end part 30a fitted in the recess 68 in this way, the fastener main body 25 and the collar 26 can be fastened, and then, the screw groove 90 can be screwed into the screw groove 69 of the recess 68. The screw groove 69 of the recess 68 and the screw groove 90 of the cap 30F are thereby engaged with each other.

With such a construction, since the one end part 30a of the cap 30F is fitted in the recess 68, even if an arc discharge occurs between the one end part 30a of the cap 30F and the surface 22b of the member 22 (the bottom surface of the recess 68), the screw grooves engaged with each other can prevent the arc from leaking to the outside.

In addition, since the cap 30F is fixed to the member 22 by the screw groove 90 formed in the one end part 30a of the cap 30F, there is no need to fasten the fastener main body 25 and the cap 30F to each other. As a result, the fastener main body 25 can be shortened, and the cap 30F can be downsized.

The components shown in the embodiments described above can be used in any appropriate combination.

Besides, the configurations described in the above embodiment can be selected or can be changed as appropriate to other configurations without departing from the gist of the present invention.

What is claimed is:

1. A lightning-resistant fastener and airframe assembly comprising:
    a structure;
    a fastener member used for fastening the structure to an airframe, the fastener member being made of a conductive material; and
    a cap installed so as to cover the fastener member projecting to the interior side of the airframe, the cap being made of an insulating material, wherein
    the fastener member has an engaging part in a portion projecting to the interior side of the airframe,
    the cap has an engaged part to be engaged with the engaging part of the fastener member in a central portion of the inner peripheral surface of the cap, the cap being installed to the fastener member with the engaged part being engaged with the engaging part of the fastener member, a tip end part of the cap opposite to the engaged part abutting against the structure, and a circumferential gap being provided radially between the fastener member and a portion of the cap other than the engaged part, and
    an elastically deformable part is provided to allow the tip end part to abut against the structure while the engaged part is engaged with the engaging part,
    wherein, as the elastically deformable part, the cap has a part continuous in the circumferential direction of the cap having a smaller thickness than another part formed between the engaged part and the tip end part or at the tip end part.

2. The lightning-resistant fastener and airframe assembly according to claim 1, wherein an annular seal member continuous in the circumferential direction of the cap is provided on the abutment surface between the tip end part of the cap and the structure.

3. The lightning-resistant fastener and airframe assembly according to claim 1, wherein the gap is filled with an insulating sealant.

4. The lightning-resistant fastener and airframe assembly according to claim 1, wherein the elasticity deformable part is provided on a part of the cap that is more elastic than a remaining portion of the cap to allow the cap to be elastically deformed in a direction to compress the cap between the engaged part and the tip end part abutting against the second member while the engaged part is engaged with the engaging part.

5. The lightning resistant fastener and airframe assembly according to claim 4, wherein the elastically deformable part is formed only between the engaged part and the tip end part of the cap, or only at the tip end part of the cap.

6. A lightning-resistant fastener and airframe assembly comprising:
a structure;
a fastener member used for fastening the structure to an airframe, the fastener member being made of a conductive material; and
a cap having one open end opening at one end and installed so as to cover the fastener member projecting to the interior side of the airframe, the cap being made of an insulating material, wherein
a recess is formed in a surface of the structure, and
the cap is installed with the open end being housed in the recess formed in the structure.

7. The lightning-resistant fastener and airframe assembly according to claim 6, wherein the outer peripheral surface of the open end of the cap has a polygonal cross section in the direction perpendicular to the axis of the fastener member, and
the inner peripheral surface of the recess includes an opposing surface that is opposite to the outer peripheral surface of the open end having the polygonal cross section.

8. The lightning-resistant fastener and airframe assembly according to claim 6, wherein the outer peripheral surface of the open end of the cap has a circular cross section in the direction perpendicular to the axis of the fastener member, and
the recess has a circular shape, and the inner peripheral surface of the recess includes an opposing surface that is opposite to the outer peripheral surface of the open end.

9. The lightning-resistant fastener and airframe assembly according to claim 6, wherein an annular seal member continuous in the circumferential direction of the cap is provided on the abutment surface between the tip end part of the cap and the structure.

10. The lightning-resistant fastener and airframe assembly according to claim 8, wherein a screw groove is formed in the outer peripheral surface of the open end of the cap, a screw groove to be engaged with the screw groove of the open end is formed in the inner peripheral surface of the recess, and the cap is installed by screwing the open end of the cap into the recess.

11. The lightning-resistant fastener and airframe assembly according to claim 6, wherein a mark that indicates the amount of a sealant charged into the cap is formed on the inner peripheral surface of the cap.

12. A lightning-resistant fastener comprising:
a fastener member configured to fasten a structure to an airframe of an aircraft such that a projecting portion of the fastener member projects to the interior side of the airframe, the fastener member being made of a conductive material; and
a cap configured to cover the projecting portion, the cap being made of an insulating material, wherein
the projecting portion comprises an engaging part,
the cap has an engaged part configured to be engaged with the engaging part of the fastener member in a central portion of the inner peripheral surface of the cap, wherein the cap is configured to be installed to the fastener member with the engaged part being engaged with the engaging part of the fastener member, a tip end part of the cap opposite to the engaged part abutting against the structure, and a circumferential gap being provided radially between the fastener member and a portion of the cap other than the engaged part, and
the cap comprises an elastically deformable part configured to allow the cap to be elastically deformed in the direction to compress the cap between the engaged part and the tip end part to abut against the structure while the engaged part is engaged with the engaging part,
wherein the cap comprises a part continuous in the circumferential direction of the cap that constitutes the elastically deformable part, wherein the elastically deformable part comprises a thickness that is less than a minimum thickness of the engaged part and the tip end part.

13. The lightning-resistant fastener according to claim 12, further comprising an annular seal member continuous in the circumferential direction of the cap and configured to be provided on the abutment surface between the tip end part of the cap and the structure.

14. The lightning-resistant fastener according to claim 12, wherein the cap is configured to be installed with the open end being housed in a recess formed in a surface the structure.

15. The lightning-resistant fastener according to claim 14, wherein the outer peripheral surface of the open end of the cap has a polygonal cross section in the direction perpendicular to the axis of the fastener member and is configured to oppose an inner peripheral surface of the recess.

16. The lightning-resistant fastener according to claim 14, wherein the outer peripheral surface of the open end of the cap has a circular cross section in the direction perpendicular to the axis of the fastener member and is configured to oppose an inner peripheral surface of the recess.

17. The lightning-resistant fastener according to claim 14, further comprising an annular seal member continuous in the circumferential direction of the cap configured to be provided on the abutment surface between the tip end part of the cap and the structure.

18. The lightning-resistant fastener according to claim 14, wherein a mark is formed on the inner peripheral surface of the cap that is configured to indicate a predetermined amount of a sealant to be charged into the cap.

* * * * *